Jan. 3, 1928.
J. A. STEVENS
1,655,207
SHOCK ABSORBER
Filed Sept. 9, 1926  2 Sheets-Sheet 2
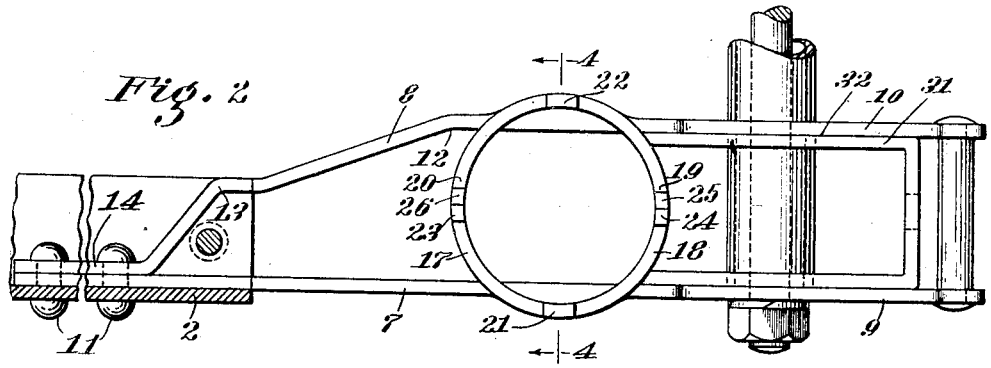
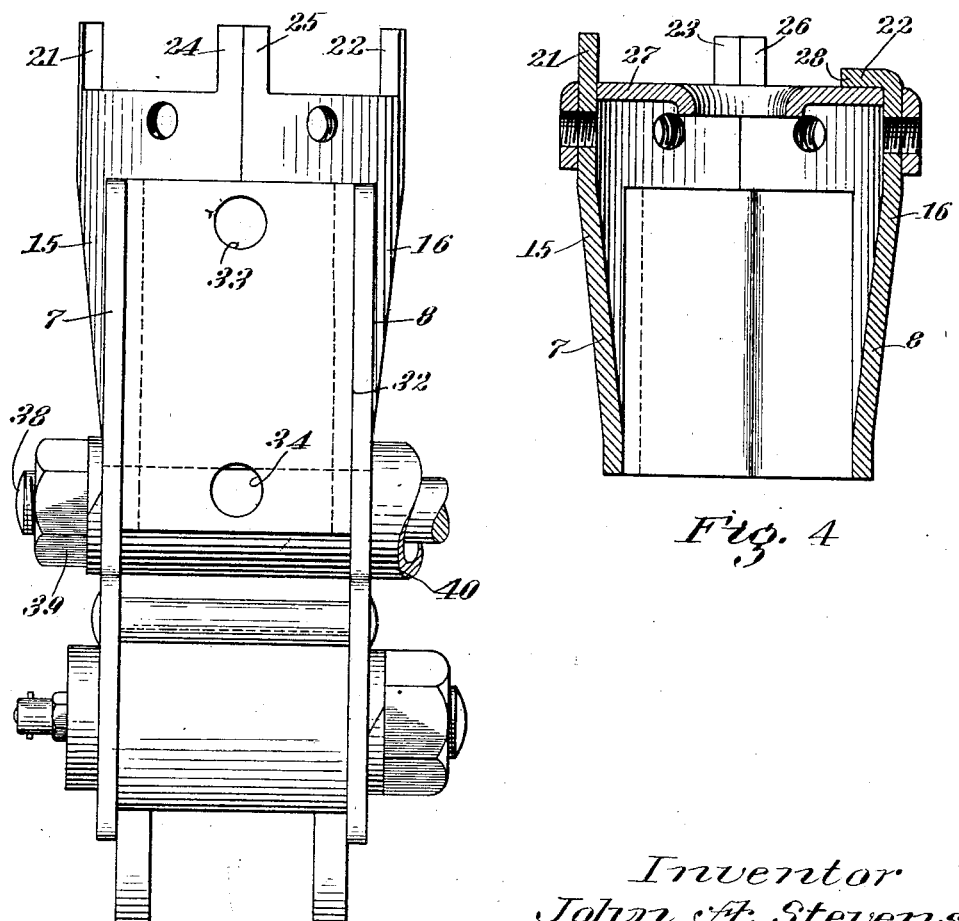
Inventor
John A. Stevens.
by Roberts, Cashman & Woodbury.
Att'ys.

Patented Jan. 3, 1928.

1,655,207

UNITED STATES PATENT OFFICE.

JOHN A. STEVENS, OF LOWELL, MASSACHUSETTS, ASSIGNOR TO STEVENS PRODUCTS COMPANY, OF LOWELL, MASSACHUSETTS, A CORPORATION OF DELAWARE.

SHOCK ABSORBER.

Application filed September 9, 1926. Serial No. 134,405.

This invention relates to shock absorbing devices usable wherever it is desired to absorb the shock caused by a quick relative movement of two members. As one of the most common uses of such devices is in connection with automobiles to absorb the shocks caused by the unevenness of the road by the insertion of the device between the chassis and springs, an embodiment of the invention usable for this purpose is specifically set forth in the following description, but it is to be understood that this is not intended to be in any manner limiting on the scope of the invention.

Among the objects of the present invention are to provide a device which will be inexpensive to construct due to the employment of few cast parts and the design of the device so that few machining operations are necessary; to provide a device in which the shock is absorbed by a pneumatic cushion but without multiplying the force of the members before it is transmitted to the cushion, so that in the adaptation of the device to an automobile, the occupants thereof literally ride on air; to provide a device where friction is substantially eliminated and at the same time the parts move in substantially predetermined paths; and to improve generally in the design and construction of devices of this kind. Other objects and advantages will be apparent from a reading of the subjoined description and appended claims, taken in connection with the accompanying drawings, in which:

Fig. 2 is a plan view of the device shown in Fig. 1 having some parts omitted and others in section;

Fig. 3 is an elevation of the device taken from the right-hand side of Fig. 1 with some parts omitted; and Fig. 4 is a section on the line 4—4 of Fig. 2 showing the method of construction.

Figure 1:
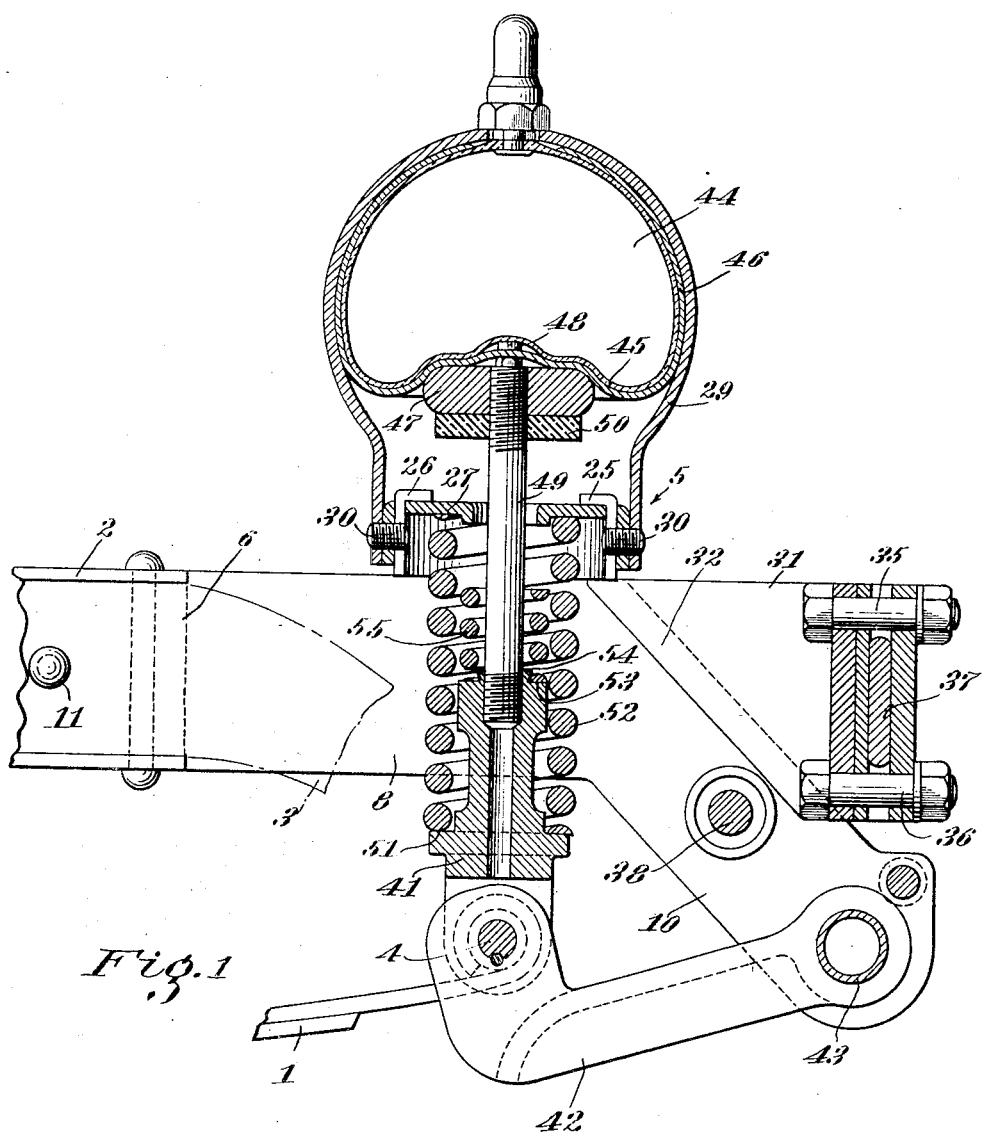
Fig. 1 is a view substantially in vertical section of one embodiment of the device as applied to an automobile.

Reference character 1 designates the usual semi-elliptical springs of an automobile which are adapted to be held to the axle by bolts or other suitable means, and 2 represents a portion of the usual chassis or frame of such a vehicle. A portion of the chassis 3 normally extends downwardly and is pivoted to one end of the spring 1 at a point 4, but when the shock absorbing device 5 is interposed between the chassis and springs, the member 3 may be cut off on a line such as 6.

The body or casing of the shock absorber is here shown as made up of two members 7 and 8 which may be struck from comparatively heavy sheet metal and pressed into shape. Members 7 and 8 are provided with forwardly and downwardly extending portions 9 and 10 respectively for the purpose later to be described and have their rear portions riveted or otherwise secured to the chassis 2 as shown at 11, for which purpose member 8 is bent inwardly as shown at 12 and 13, and has a portion 14 parallel with the member 7 and closely adjacent thereto.

The central portions of members 7 and 8 are struck or bent outwardly as shown at 15 an 16 and are provided with inwardly turned portions 17, 18, 19 and 20 having lugs 21 and 22 respectively an lugs 23, 24, 25 and 26, the last mentioned lugs being only half as wide as lugs 21 and 22, the half-size lugs being on the ends of members 17, 18, 19 and 20 respectively. Lugs 23 and 26 together form the equivalent of a single whole size lug as at 21 or 22, as do half-size lugs 24 and 25, whereby the lugs fit up through similar peripherally arranged openings in an annular cup-shaped member 27 and may be turned over as shown at 28 on Fig. 4 and welded in position if desired. While I have shown the equivalent of only four whole sized lugs, it is to be understood that any suitable number may be employed, also that any other suitable method of fastening the parts together may, if desired, be employed.

A dome 29 which may be made as an integral casing is adapted to be held in position around member 27 by a plurality of stud screws 30 peripherally spaced about the dome, which screws extend through the member 27 and into members 7 and 8, thereby serving additionally to fasten those parts together.

A U-shaped member having its legs cut off obliquely is shown at 31 and may be welded or otherwise secured to the forwardly extending portions 9 and 10 along the contacting surface 32. Member 31 serves to retain members 9 and 10 in a fixed position relatively to each other and also may be provided with apertures 33 and 34 for the reception of bolts 35 and 36 which hold a suitable bumper 37 in position when the device is used on an automobile and which may support the shock absorber itself or other devices in different applications of the invention.

A rod 38, threaded and provided with a nut 39 on its end and a suitable spacing sleeve 40, may be used to space apart two shock absorbers when used in parallel, as on the front of a vehicle.

A plunger generally indicated at 41 is arranged to be pivoted to the spring 1 at 4, at which point there is also pivoted one end of a rocker arm 42, the other end of which is pivoted between the members 9 and 10 at 43, so that the point 4 swings through a predetermined arc relatively to the casing, while at the same time all of the movement of the end of the spring 1 is transmitted directly to the plunger without any intermediate leverage either to multiply or divide the effective pressure thereon. The dome 29 encloses a chamber 44, the limits of which are defined by a collapsible ball of rubber or other suitable resilient material 45 which may be encased within a carcass of rubberized canvas or other suitable material 46. The end of the piston 41 is provided with a disk-like support or head 47 which bears against the lower side of the carcass 46 and may be bolted thereto by a bolt 48 extending into the piston rod 49. Beneath the head 47 a disk-like buffer 50 of rubber or any other suitable material may be provided.

The plunger has thereon a shoulder 51 on which is adapted to rest one end of a heavy coil spring 52, the other end of which abuts the under side of the cup-shaped member 27. It is to be understood that springs of different weights may be inserted in place of spring 52 according to the load which is normally to be carried. The plunger 41 has a second shoulder 53 thereon which is provided with the upwardly flaring extension 54 adapted to engage the endmost turn of a second coil spring 55 which may be termed a check spring. The spring 55 normally terminates short of the cup-shaped member 27 whereby it will be inoperative until the plunger has moved upwardly, as seen on the drawings, a predetermined distance at which time it will be effective to act in tandem with spring 52 and the collapsible ball to oppose movement of the plunger in an upward direction. Movement of the plunger in a downward direction is limited by member 50 abutting against member 27 thereby providing a resilient stop. It is to be understood, of course, that any other resilient stop means, such as a coiled spring, might be substituted for member 50.

There is little or no friction in this device as the plunger has only one bearing, namely at 4 and does not have any lateral bearing on any other part of the device. This construction provides a substantially unguided plunger as only the point 4 of the plunger is constrained to move in a predetermined path, in this case about the arc of a circle whose center is the bearing 43. It is obvious, therefore, that I have provided a device which may be made to a large extent from sheet metal, with the possible exception of the dome 29; which is efficient to absorb the shocks caused by a quick relative movement of members 1 and 2 and which when applied to an automobile allows the occupants literally to ride on air; and at the same time I have provided an extremely simple, inexpensive and easily constructed device which may be available for a great variety of uses and which is eminently satisfactory in carrying out the objects for which it is designed. I do not wish to be limited, therefore, except by the scope of the appended claims.

I claim:

1. A device for absorbing the shock caused by the quick relative movement of two members comprising a body portion fixed to one of said members, a plunger operatively connected to the other of said members, said body portion being constructed of two pressed metal parts, each having extended portions adapted to be rigidly connected to said first mentioned member and portions interfitting with a cup-shaped member whereby to hold the parts together, and means for opposing movement of said plunger in one direction.

2. A device for absorbing the shock caused by the quick relative movement of two members comprising a body portion fixed to one of said members, a plunger operatively connected to the other of said members, said body portion being constructed of two pressed metal parts each having extended portions adapted to be rigidly connected to said first mentioned member, said parts having a U-shaped member affixed thereto which is adapted to be used as an additional means of support, a cup-shaped member having apertures therein, lugs integral with said parts adapted to protrude through said apertures and be bent over on the other side firmly to hold the parts in assembled relation, and means for opposing movement of said plunger in one direction.

3. A device for absorbing the shock caused by the quick relative movement of two members comprising a body portion fixed to one of said members, a plunger operatively connected to the other of said members, said body portion being constructed of two pressed metal parts each having extended portions adapted to be rigidly connected to said first mentioned member, a dome fitting over both of said pressed metal members and having a compression chamber therein filled with a compressible fluid, a flexible wall confining the fluid within the chamber.

against which said plunger presses, whereby movement of said plunger in one direction will be opposed by increased pressure of the fluid within the chamber.

4. A device for absorbing the shock caused by the quick relative movement of two members comprising a casing fixed to one of said members, a plunger directly connected to the other of said members, only one point on said plunger being guided in a predetermined path relatively to said casing, pneumatic means acting in tandem with spring means for normally opposing movement of said plunger in one direction, and additional means effective only after a predetermined movement of said plunger in either direction for resiliently opposing and stopping such movement.

5. A device for absorbing the shock caused by the quick relative movement of two members comprising a casing fixed to one of said members, a plunger directly connected to the other of said members, a rocker arm having one end pivoted to said casing and the other to the point of connection between said plunger and said other member, said casing enclosing a hollow collapsible member filled with a compressible fluid and having a flexible wall, said plunger having a shoulder thereon and a head abutting said wall, an abutment on said casing adjacent to said plunger, a spring extending between said shoulder and said abutment acting in tandem with said collapsible member to oppose movement of said plunger in one direction, and a buffer of resilient material on said plunger adjacent to said head for limiting movement of said plunger in the opposite direction.

6. A device for absorbing the shock caused by the quick relative movement of two members comprising a casing fixed to one of said members, a plunger directly connected to the other of said members, a rocker arm having one end pivoted to said casing and the other to the point of connection between said plunger and said other member, said casing enclosing a hollow collapsible member filled with a compressible fluid and having a flexible wall, said plunger having two shoulders thereon and a head abutting said wall, an abutment on said casing adjacent to said plunger, a spring extending between one of said shoulders and said abutment acting in tandem with said collapsible member to oppose movement of said plunger in one direction, a second spring fixed to the other shoulder and normally terminating short of said abutment, said second spring being effective only on an extremely heavy shock to act in tandem with said collapsible member and first mentioned spring, and a buffer of resilient material on said plunger adjacent to said head for limiting movement of said plunger in the opposite direction.

Signed by me at Lowell, Massachusetts, this 30 day of August 1926.

JOHN A. STEVENS.